United States Patent Office.

DANA BICKFORD, OF BOSTON, MASSACHUSETTS.

Letters Patent No. 69,752, dated October 15, 1867.

IMPROVED PROCESS OF OBTAINING USEFUL FIBRES.

*The Schedule referred to in these Letters Patent and making part of the same.*

TO ALL WHOM IT MAY CONCERN:

Be it known that I, DANA BICKFORD, of Boston, in the county of Suffolk, and State of Massachusetts, have discovered a process whereby the common weed known by the name of the Asclepias, can be cultivated and prepared profitably in any climate or country, and the fibre and waste made available in the place of other fibres or paper-stock or for paper-pulp for ornaments and useful articles. This weed if allowed to grow wild, or pulled up and dried, does not answer the purpose, as the fibre is not strong or abundant enough to pay. But if it is properly cultivated, and cut up at the right time and rotted, the fibre is very strong, white, and has a beautiful gloss, and furthermore, there is a large quantity on each stalk, while the stalk itself, and waste from the fibre, make the best of paper-pulp for different uses, as named before. Neither does it answer, after these stalks are rotted, to brake or hatchel it like flax, as the fibres are too short and fine. I have found, after long and thorough experimenting, that this weed can be cultivated so as to yield a very large crop to the acre. My final conclusion after all these different trials is, that the root or seed of this plant should either be planted or sown in rows like the cotton-plant, leaving a space between for the workmen to pass between to keep it clear from weeds, and also to gather the bulbs as they ripen. After it is ripe, or the frost has come, the stalks should be cut up and spread to rot like flax, which it will do much quicker. After rotting, it should be crushed with either corrugated or smooth rollers, or their equivalents, then the stalk and fibre will easily separate.

After the material has been taken from the ground, the roots should be covered with manure, which will answer the double purpose of dressing, and protection from the cold, thus giving them a good start in the spring.

The fibre can be combed or ginned up with a fast revolving machine, it being held tight between rollers or clamps made for the purpose, pressing it up just fast enough to make it of the right fineness for the purpose required. The fibre from the bulbs can be used with this, or used separate, for batting, felting, or for the imitating of plush and velvet, or it can be united with the waste of the stalk for the making of pulp for paper and other purposes. This pulp or the fibre can be mixed with rubber or other gums for different purposes with great success, and give a correct imitation of almost every substance.

What I claim, and wish to secure by Letters Patent, is—

1. The preperation of the fibre of the above named weed, substantially as before described and set forth.
2. The uniting the pulp or fibre with rubber and other gums, also the imitating of velvet, plush, and other articles, as described.

DANA BICKFORD.

Witnesses:
A. M. LAWSON,
M. E. BICKFORD.